(No Model.)
ISAAC M. FISHER & INA M. FISHER.
JAR FILLER AND HOLDER.
No. 483,049. Patented Sept. 20, 1892.
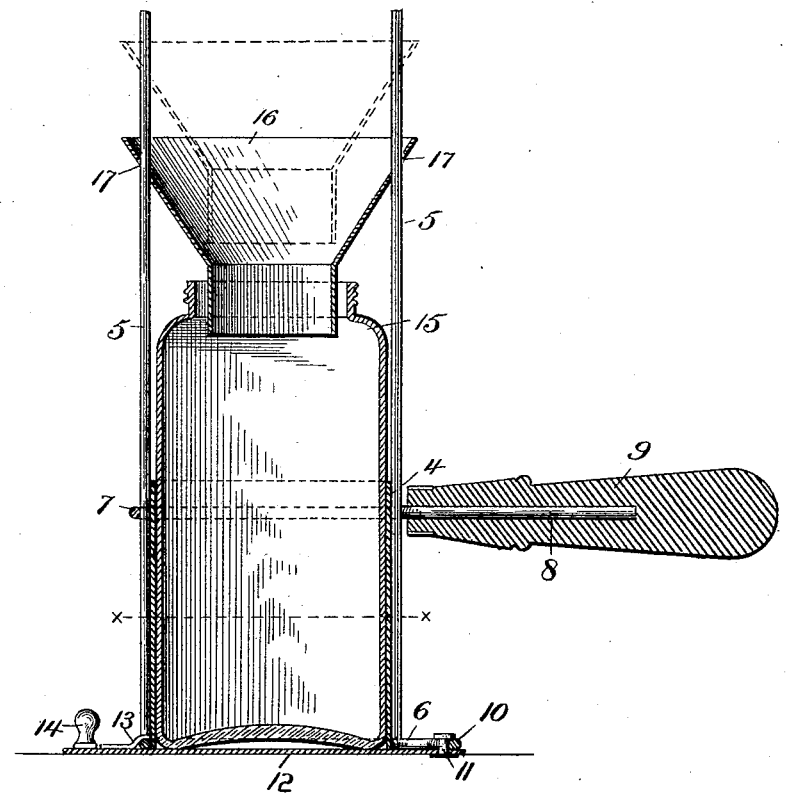
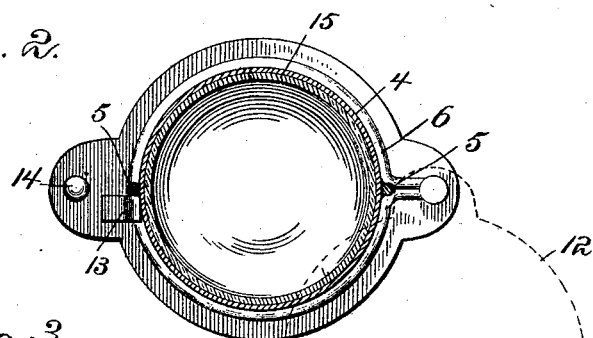
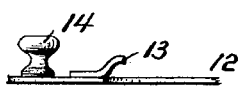

UNITED STATES PATENT OFFICE.

ISAAC MELVIN FISHER AND INA MARY FISHER, OF BURROWS, MISSOURI.

JAR FILLER AND HOLDER.

SPECIFICATION forming part of Letters Patent No. 483,049, dated September 20, 1892.

Application filed April 30, 1892. Serial No. 431,274. (No model.)

*To all whom it may concern:*

Be it known that we, ISAAC MELVIN FISHER and INA MARY FISHER, citizens of the United States of America, residing at Burrows, in the county of Bates and State of Missouri, have invented certain new and useful Improvements in Jar Fillers and Holders, of which the following is a specification, reference being had therein to the accompanying drawings.

The object of our invention is to provide a means for handling fruit-jars while in the operation of canning, and we attain our object in the manner hereinafter described and claimed.

In the drawings, Figure 1 is an elevation of our device in section. Fig. 2 is a plan view through the line x x of Fig. 1. Fig. 3 is a detail of the catch.

Like characters of reference indicate the same parts throughout the several views.

The cylindrical receptacle 4, preferably of tin, is attached by soldering to the standards 5 5 at its sides the circular wire support 6 at its bottom and the upper encircling wire support 7 near its top. The standards 5 and the supports 6 and 7 are preferably made of copper wire. The encircling upper support 7 has projecting ends 8 for the reception of the handle 9. The circular bottom support 6 has loop 10 for the reception of the rivet 11, fixed in the swinging bottom 12, but loose in loop 10, so as to form a hinge. The laterally-swinging bottom 12 is preferably of tin, having a diameter greater than the cylindrical receptacle 4, and is hinged to the bottom supporting-wire 6 by the rivet 11 in loop 10, as above described, having on the opposing side the catch 13 and the hand-knob 14 for a hold to operate it. Funnel 16 has circular openings 17 for the reception of the standards 5. The funnel is held upon the standards at any desired point above the fruit-jar 15 by the resiliency of the standards 5 when pressed inwardly to receive the funnel.

The operation of our device is as follows: The bottom 12 being swung aside, as indicated in dotted lines in Fig. 2, the jar is placed under the circular receptacle 4, and the bottom 12 is swung under the jar, the catch 13 engaging and clasping the bottom supporting-wire 6 and stopping against standard 5. The holder and jar is then immersed in hot water, the funnel adjusted for filling, and the jar filled. The device containing the jar is then removed from the hot bath, the bottom 12 swinging aside, the jar released by raising the holder, and the operation repeated.

Having thus fully described our invention, what we claim as new, and desire to secure by Letters Patent, is—

1. A fruit-jar filler having side standards, a circular receptacle attached to said standards, and a bottom and upper encircling wire support, in combination with a laterally-swinging bottom, substantially as described.

2. A fruit-jar filler having side standards, a circular receptacle attached to said standards, and a bottom and upper encircling wire support, in combination with a laterally-swinging bottom having catch 13 to clasp the bottom wire support and stopping against a side standard, substantially as set forth.

3. A fruit-jar filler having side standards, a circular receptacle attached to said standards, and a bottom and upper encircling wire support, in combination with a laterally-swinging bottom having on one side a catch to clasp the bottom wire support and stopping against a side standard and on the opposing side hinged to the bottom supporting-wire by a rivet loosely operating in a loop in the bottom supporting-wire, substantially as set forth.

4. A fruit-jar filler having side standards, a circular receptacle attached to said standards, and a bottom and upper encircling wire support, in combination with a laterally-swinging bottom having catch 13 to clasp the bottom wire support and stopping against a side standard, and a funnel held in position by the resiliency of the side standards, substantially as set forth.

5. A fruit-jar holder and filler consisting of side standards, a circular receptacle attached to said standards, and a bottom and upper encircling wire support, a laterally-swinging bottom hinged to the bottom supporting-wire and provided with a clasp to engage the bottom supporting-wire, a funnel held in position by the resiliency of the side standards which support the funnel, and a handle attached to the free end of the upper encircling supporting-wire, substantially as set forth.

In testimony whereof we affix our signatures in presence of two witnesses.

ISAAC MELVIN FISHER.
    INA MARY FISHER.

Witnesses:
 J. T. TRICKETT,
 FREI DAVIS.